United States Patent
Olsen et al.

(10) Patent No.: US 9,058,905 B2
(45) Date of Patent: Jun. 16, 2015

(54) AUTOMATED INSIDE REACTOR INSPECTION SYSTEM

(75) Inventors: Skyler Kevin Olsen, San Antonio, TX (US); Benjamin J. Lagosz-Sinclair, San Antonio, TX (US)

(73) Assignee: IHI Southwest Technologies, San Antonio, TX (US)

( * ) Notice: Subject to any disclaimer, the term of this patent is extended or adjusted under 35 U.S.C. 154(b) by 249 days.

(21) Appl. No.: 13/424,055

(22) Filed: Apr. 6, 2012

(65) Prior Publication Data

US 2013/0266109 A1    Oct. 10, 2013

(51) Int. Cl.
*G21C 7/00* (2006.01)
*G21C 17/01* (2006.01)
*G21C 17/013* (2006.01)

(52) U.S. Cl.
CPC .............. *G21C 17/01* (2013.01); *G21C 17/013* (2013.01)

(58) Field of Classification Search
CPC ............. G01N 1/00; G01N 1/19; G01N 1/22; G01N 1/23; G01N 1/25; G01N 1/27; G21C 17/013; G21C 17/007; G21C 17/01; G21C 17/00; G21C 17/017; G21C 17/06; G21C 17/101; G21Y 2002/00; G21Y 2002/207; G21Y 2002/304; G21Y 2004/00; B63B 59/10; B62D 57/00; B62D 57/024
USPC ............ 376/249, 248, 245, 260, 258; 73/623, 73/865.8, 866.5, 637; 901/1, 2, 14, 19, 27, 901/30; 114/222, 303; 15/327.1, 1.7; 318/568.12

See application file for complete search history.

(56) References Cited

U.S. PATENT DOCUMENTS

| | | | | |
|---|---|---|---|---|
| 3,002,375 A | * | 10/1961 | Storer et al. | 73/640 |
| 3,205,435 A | * | 9/1965 | Nuttall | 324/220 |
| 3,713,121 A | * | 1/1973 | Fasano et al. | 360/255.7 |
| 3,780,571 A | * | 12/1973 | Wiesener | 376/249 |
| 3,901,073 A | * | 8/1975 | Dent et al. | 73/637 |
| 3,926,277 A | * | 12/1975 | Shino et al. | 180/164 |
| 4,029,164 A | * | 6/1977 | Urakami | 180/164 |
| 4,089,029 A | * | 5/1978 | Castrodale et al. | 360/99.05 |
| 4,095,378 A | * | 6/1978 | Urakami | 451/88 |
| 4,158,309 A | * | 6/1979 | Elsner et al. | 73/641 |
| 4,218,293 A | * | 8/1980 | Nawrot | 205/503 |
| 4,345,658 A | * | 8/1982 | Danel et al. | 180/8.5 |
| 4,462,255 A | * | 7/1984 | Guess et al. | 73/633 |
| 4,502,407 A | * | 3/1985 | Stevens | 114/222 |
| 4,657,728 A | * | 4/1987 | Coppa et al. | 376/248 |
| 4,757,258 A | * | 7/1988 | Kelly et al. | 324/220 |
| 4,919,194 A | * | 4/1990 | Gery et al. | 165/11.2 |
| 4,954,312 A | * | 9/1990 | McDonald et al. | 376/260 |
| 4,971,591 A | * | 11/1990 | Raviv et al. | 446/177 |
| 5,109,718 A | * | 5/1992 | Gugel et al. | 73/866.5 |
| 5,164,151 A | * | 11/1992 | Shah et al. | 376/260 |
| 5,173,248 A | * | 12/1992 | Shibanuma et al. | 376/260 |
| 5,193,405 A | * | 3/1993 | Oomichi et al. | 73/865.8 |

(Continued)

*Primary Examiner* — Jack W Keith
*Assistant Examiner* — Julia Prendergast
(74) *Attorney, Agent, or Firm* — Gunn, Lee & Cave, P.C.

(57) ABSTRACT

An apparatus and method for maintaining contact between a pod of transducers and an inner surface of a reactor pressure vessel filled with water of a nuclear power plant is described. An underwater carriage carries the pod of transducers each of which is independently movable and are constantly urged against the surface of the vessel during inspection. Each transducer is independently pivotable about two axes. Each transducer emits and receives signals to detect any flaws of potential problems in the reactor pressure vessel.

1 Claim, 8 Drawing Sheets

(56) References Cited

U.S. PATENT DOCUMENTS

| | | | |
|---|---|---|---|
| 5,214,616 A * | 5/1993 | Terhune et al. | 367/99 |
| 5,515,589 A * | 5/1996 | Kazirskis et al. | 29/402.18 |
| 5,561,883 A * | 10/1996 | Landry et al. | 15/302 |
| 5,730,553 A | 3/1998 | Miura et al. | |
| 5,852,984 A | 12/1998 | Matsuyama et al. | |
| 5,853,984 A | 12/1998 | Davis et al. | |
| 6,104,772 A * | 8/2000 | Dippel et al. | 376/249 |
| 6,104,970 A * | 8/2000 | Schmidt et al. | 701/2 |
| 6,525,500 B2 * | 2/2003 | Hatley et al. | 318/568.12 |
| 6,742,617 B2 * | 6/2004 | Jeswine et al. | 180/164 |
| 6,877,389 B2 * | 4/2005 | Lewis et al. | 73/866.5 |
| 7,075,296 B2 * | 7/2006 | Moore | 324/262 |
| 7,076,335 B2 * | 7/2006 | Seemann | 700/248 |
| 7,296,488 B2 * | 11/2007 | Hock et al. | 73/866.5 |
| 7,314,343 B2 * | 1/2008 | Hawkins et al. | 414/749.4 |
| 7,443,154 B1 * | 10/2008 | Merewether et al. | 324/67 |
| 7,525,276 B2 * | 4/2009 | Eaton | 318/581 |
| 7,769,123 B2 * | 8/2010 | Rowell et al. | 376/249 |
| 2003/0048081 A1 * | 3/2003 | Seemann | 318/68 |
| 2007/0223643 A1 * | 9/2007 | Yamane et al. | 376/249 |
| 2008/0205575 A1 * | 8/2008 | Morris et al. | 376/249 |

* cited by examiner

AUTOMATED INSIDE REACTOR INSPECTION SYSTEM

BACKGROUND OF THE INVENTION

1. Technical Field

The present invention relates to an underwater carriage for the inspection of the inner surface of a pressure vessel of a nuclear reactor and, more particularly, to the mounting of the transducers on the underwater carriage.

2. Description of the Prior Art

Under the Atomic Energy Act of 1954, the United States Nuclear Regulatory Commission ("NRC") has the authority to inspect nuclear power plants to protect public health and safety. A part of the NRC inspection program assesses whether the equipment is properly maintained to ensure safe operation.

Reactor inspections are conducted by independent inspectors to provide an assessment of the plant's condition and performance. One of the inspections that is routinely performed on a nuclear power plant is an inspection of the walls of the reactor vessel, reactor containment vessel, and/or core shroud.

There is a family of nuclear reactors known as light water reactors (LWR) which are cooled and modulated with ordinary water and tend to be simpler and cheaper to build than other types of nuclear reactors. LWRs can be sub-divided into three categories of (1) boiling pressure reactors (BPRs), (2) boiling water reactors (BWRs) and (3) super-critical water reactors (SCWRs). An LWR will have a containment vessel and a reactor pressure vessel. Generally, LWRs are divided into a BWR or BPR type of system.

Regardless of the type of nuclear power plant, the containment vessel, reactor vessel and other vessels used in generating nuclear power have to be inspected to make they are still structurally sound. Such inspections have to take place while the vessels are still filled with a fluid such as water, but while that particular unit of a nuclear power plant is not in operation.

In the past, carriages have been developed to move through water while simultaneously attaching itself to the walls of a vessel. A good example is U.S. Pat. No. 5,730,553, which is incorporated by reference, that has a skirt around the underwater carriage with thrust fans for attaching the underwater carriage to the wall of a vessel being inspected. The underwater carriage would then move around on the wall of the vessel being inspected. The underwater carriage may carry transducers for the inspection of walls of the vessel on which the underwater carriage is located.

Such an underwater carriage with the transducers being carried thereon is illustrated in U.S. Pat. No. 5,852,984, which is incorporated by reference. To ensure the transducers which are ultrasonic probes are in good contact with the surface being inspected, the '984 Patent has sweeping units to make sure the surface of the walls of the vessel are clean and smooth. The ultrasonic probe can then be used to detect flaws and cracks in the walls of the vessel including nuclear reactor pressure vessels. However, in these prior designs, it was always a problem of maintaining the transducer or ultrasonic probe a uniform distance from the inside surface of the wall of the vessel. If a uniform distance is not maintained, false readings could be indicated to the operator at the surface, which could be misinterpreted as a flaw in the vessel.

Applicant has discovered a way to overcome these false readings.

BRIEF SUMMARY OF THE INVENTION

It is an object of the present invention to provide an apparatus and method for attachment of a pod of transducers/probes to a carriage moveable in water.

It is a further object of the present invention to provide a method for attaching a pod of transducers/probes to an underwater carriage for inspection of the walls of a vessel filled with water.

It is a further object of the present invention to provide a method and apparatus for inspecting containment vessels, pressure vessels and/or nuclear reactor vessels while filled with a fluid such as water to determine the structural integrity of the vessels.

It is yet another object of the present invention to provide pods of transducers/probes attached to an underwater carriage that moves along the internal surface of a vessel, which pods are used to determine the structural integrity of the vessel while the underwater carriage moves along its internal surface.

In a nuclear power plant, numerous vessels such as a containment vessel, pressure vessel, nuclear reactor vessel, just to name few, have to be inspected on a regular basis to ensure their structural integrity. These vessels are normally filled with a fluid such as water. When the nuclear reactor unit is not in use, a reactor containment vessel and/or reactor pressure vessel can be opened at the top and an underwater vehicle lowered therein. The underwater carriage may have transducer/probes thereon which emit ultrasonic signals into the walls of the vessel. The ultrasonic signals will reflect off of any defect in the vessel, which reflected signals are received and recorded indicating a flaw or structural weakness in the vessel.

Because a single transducer/probe may give inaccurate readings depending upon movement of the transducer/probe along the surface of the vessel, a collection or pod of transducer/probes is found to be much more effective in determining the structural integrity of the vessel. However, even using a pod of transducers/probes, it is important to maintain as many of the transducers/probes as close to or against the inside surface of the vessel as possible. Structural items in the vessel may limit movement of the underwater vehicle inside of the vessel. By extending the pod outward on either the left or right side, a much more thorough and complete inspection of the vessel can be obtained to more accurately determine if there is a structural flaw in the vessel. A complete and thorough inspection is extremely important in nuclear reactor vessels because the vessels are subject to extremes of temperature and pressure.

The present invention provides for an apparatus and method for attaching a pod of transducers/probes to an underwater carriage. The transducers/probes are contained in the pod and are independently articulated and urged against the walls of the vessel being inspected.

DESCRIPTION OF THE PREFERRED EMBODIMENT

Figure 1:
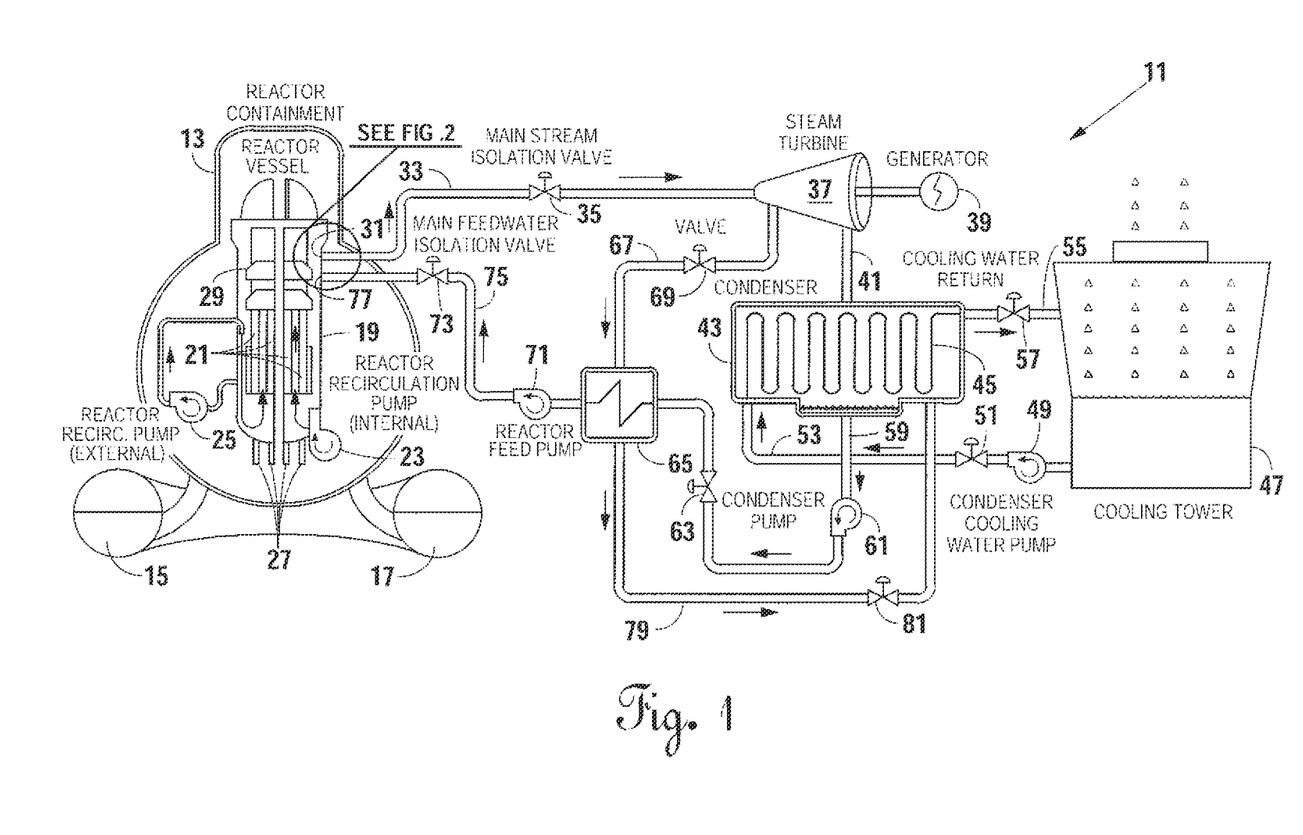
FIG. 1 is an illustrative pictorial view of a nuclear power plant.

An illustrative flow diagram for a nuclear power plant for generating electricity is shown in FIG. 1 and is represented generally by reference numeral 11. The nuclear power plant 11 has a reactor containment vessel 13 that has a Taurus 15 with an auxiliary water feed 17, which is a backup water supply for the nuclear power plant 11.

Inside of the reactor containment vessel 13 is located a reactor pressure vessel 19. A bundle of fuel rods 21 absorb a neutron to cause nuclear fission and release of other neutrons. The nuclear fission heats the water contained within reactor pressure vessel 19 to convert the water to steam.

To ensure the bundle of fuel rods 21 remain immersed in water an internal reactor recirculation pump 23 continues to recirculate water over the bundle of fuel rods 21. Also, an external reactor recirculation pump 25 circulates water within the reactor pressure vessel 19 to ensure the bundle of fuel rods 21 remain cool and immersed in the water.

While in the reactor pressure vessel 19 different fluids have been used, including gas, liquid metal or molten salts to ensure that the nuclear reaction does not run away. Control rods 27 are located in the bottom of the reactor pressure vessel 19. The control rods 27 absorb some of the released neutrons to prevent too large of a nuclear reaction with the bundle of fuel rods 21.

Above the bundle of fuel rods 21 is located heat exchanger 29, which is used to convert the water to steam. Steam generated in the reactor pressure vessel 19 enters steam line 33 through outlet nozzle 31. The steam flows through the steam line 33 and the main steam isolation valve 35 to enter steam turbine 37. As the steam turns the steam turbine 37, steam turbine 37 turns generator 39, which generates electricity.

After the steam flows through the steam turbine 37, a major portion of the steam flows through the main steam exit conduit 41 to condenser 43. Circulating through the condenser coil 45 is cooling water received from the cooling tower 47 via condenser cooling water pump 49, cooling water control valve 51 and cooling water inlet conduit 53. The cooling water returns to the cooling tower 47 via cooling water return conduit 55 and cooling water return valve 57. The cooling water can be of any convenient source such as lake water or river water. The cooling water does not have to be refined or processed.

From condenser 43 through the feed water return conduit 59, the water is being pumped by condenser pump 61 through water return valve 63 into a feed water heater/preheater 65. The feed water flowing back to the reactor pressure vessel 19 is heated/preheated inside of feed water heater/preheater 65, which receives some of the steam flowing through steam turbine 37 through preheater steam conduit 67 and control valve 69 to feed water heater/preheater 65. The feed water heater/preheater 65 increases the temperature of the feed water significantly prior to returning to the reactor pressure vessel 19 via reactor feed pump 71, main feed water isolation valve 73 and main feed water return conduit 75. The main feed water is discharged into the reactor pressure vessel 19 through return nozzle 77.

Any remaining portion of the preheater steam received in the feed water heater/preheater 65 flows to condenser 43 through preheater steam conduit 79 and preheater steam control valve 81.

The temperature and the pressure inside some of the vessels, especially the reactor pressure vessel 19, can vary greatly. Pressure can be in the thousands of pounds per square inch. Temperatures inside of the reactor pressure vessel can be as much as 130° F. Because of the large variations in temperature and pressure, it is important to inspect all of the vessels, especially the reactor pressure vessel 19 to make sure the vessel is still structurally sound. The present invention is directed towards an underwater carriage that has transducers mounted thereon for inspecting the walls of a vessel (such as the reactor pressure vessel 19) while the vessel is filled with a fluid such as water.

Figure 2:
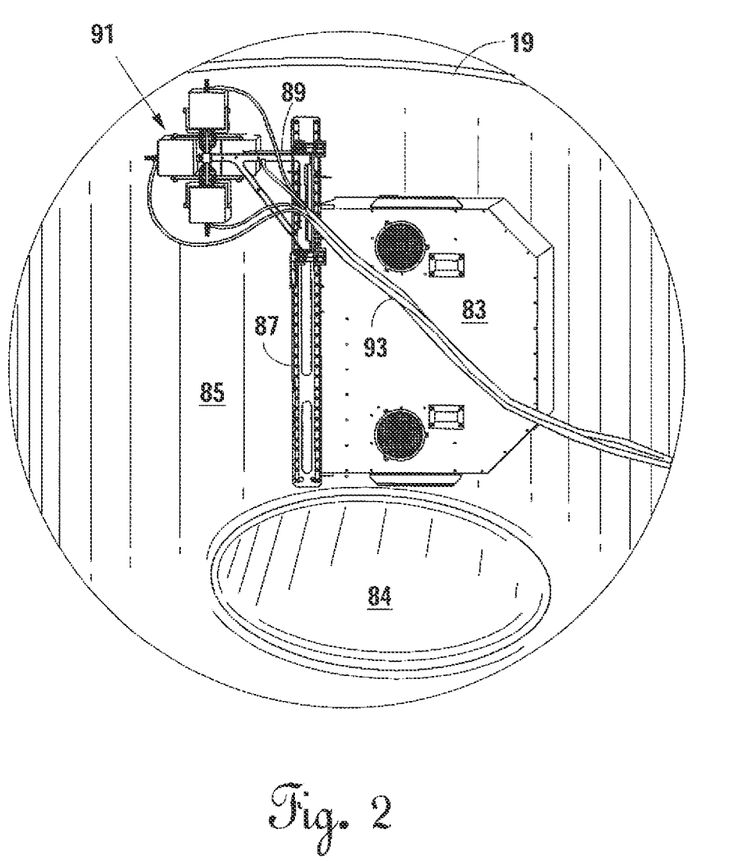
FIG. 2 is an enlarged perspective view of the inside of the reactor vessel of FIG. 1 with the present invention located therein.

Referring to FIG. 2, which is an enlarged partial view of the inside of the reactor pressure vessel 19, an underwater carriage 83 is attached to the inner surface 85 of the reactor pressure vessel 19. Nozzle 84 allows a fluid such as water to flow into the reactor pressure vessel 19. Mounted on rail support 87 is a right Y-arm offset 89. On the front of the right Y-arm offset 89 is a pod 91 of transducers, all of which will be explained in more detail subsequently. Bundled cable 93 carries the signals from underwater carriage 83 and the pod of transducers 91 back to the surface.

During an inspection as pictorially illustrated in FIGS. 1 and 2, the nuclear power plant 11 is shut down. The top of the reactor containment vessel 13 is removed. The top of the reactor pressure vessel 19 is also removed. With the reactor pressure vessel 19 still filled with water or some other similar fluid, the inspection of the reactor pressure vessel 19 occurs. The underwater carriage 83 is lowered into the water (not shown because the water is clear) and attached to the inner surface 85 of the reactor pressure vessel 19.

As will be explained in detail subsequently, the underwater carriage 83 in combination with the pod 91 of transducers located thereon can inspect the reactor pressure vessel 19 with a maximum amount of contact by the transducers with the inner surface 85. This allows the maximum of the nooks and crannies on the reactor pressure vessel 19 to be inspected with the maximum overall coverage.

Figure 3:
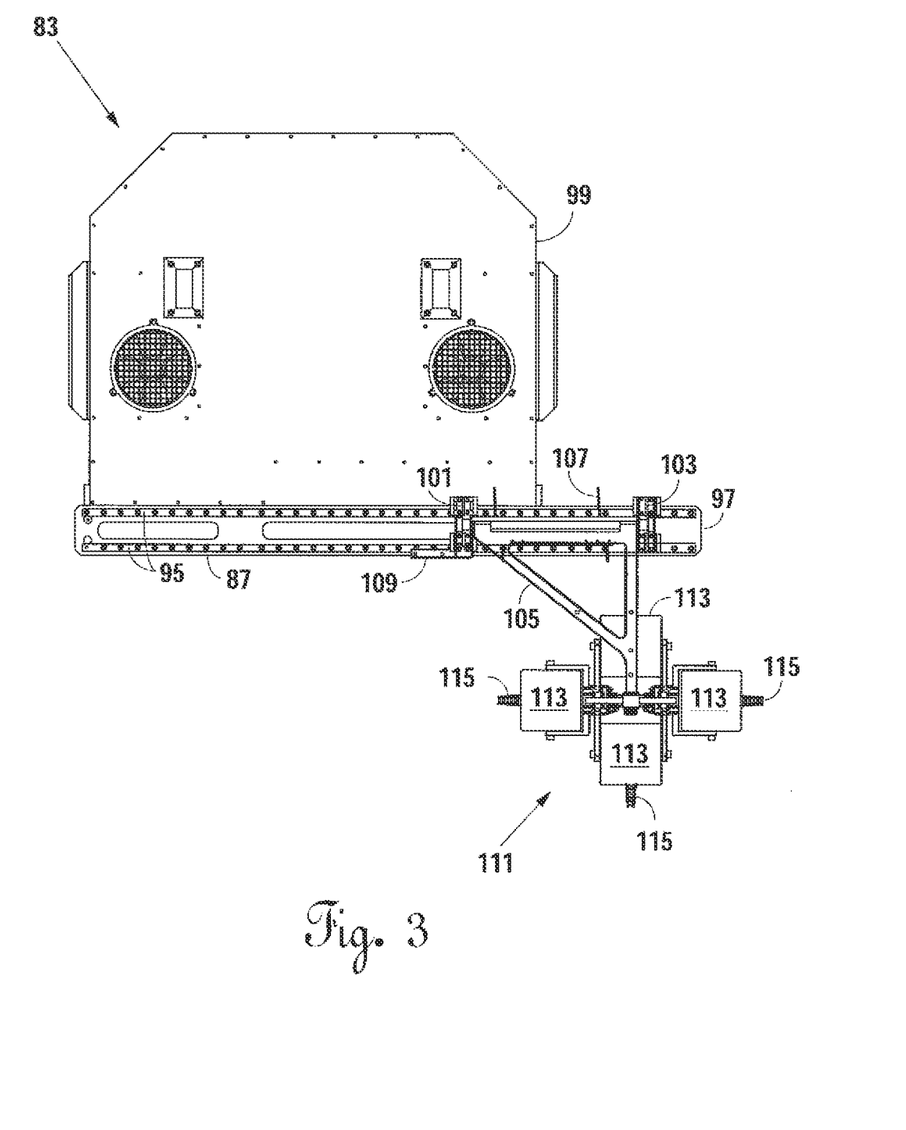
FIG. 3 is a top view of an underwater carriage having a pod of transducers pivotally mounted on bearing rails on a left front side thereof.

Referring to FIG. 3, a top view of an underwater carriage 83 is shown. On the front of the underwater carriage 83 is located a rail support 87. On the top of the rail support 87 are located bearing rails 95. The left end 97 of the bearing rail 95 extends beyond the left side 99 of underwater carriage 83. Left and/or right is determined by the direction of movement of the underwater carriage 83, the same as left and right is determined on an automobile.

Mounted on the bearing rails 95 are bearing slide rails 101 and 103. Pivotally attached to bearing slide rails 101 and 103 is left Y-arm offset 105. Left Y-arm offset 105 is continually urged downward by spring 107. Mounted on the bearing rail 95 and bearing slide rail 101 is Y-arm bracket 109.

On the front of the left Y-arm offset 105 is located a pod 111 of transducers 113. Each of the transducers 113 connect through electrical connection 115 via the cable bundle 93 (see FIG. 2) to the top of the reactor containment vessel 19 where the measurements are physically being recorded.

Figure 4:
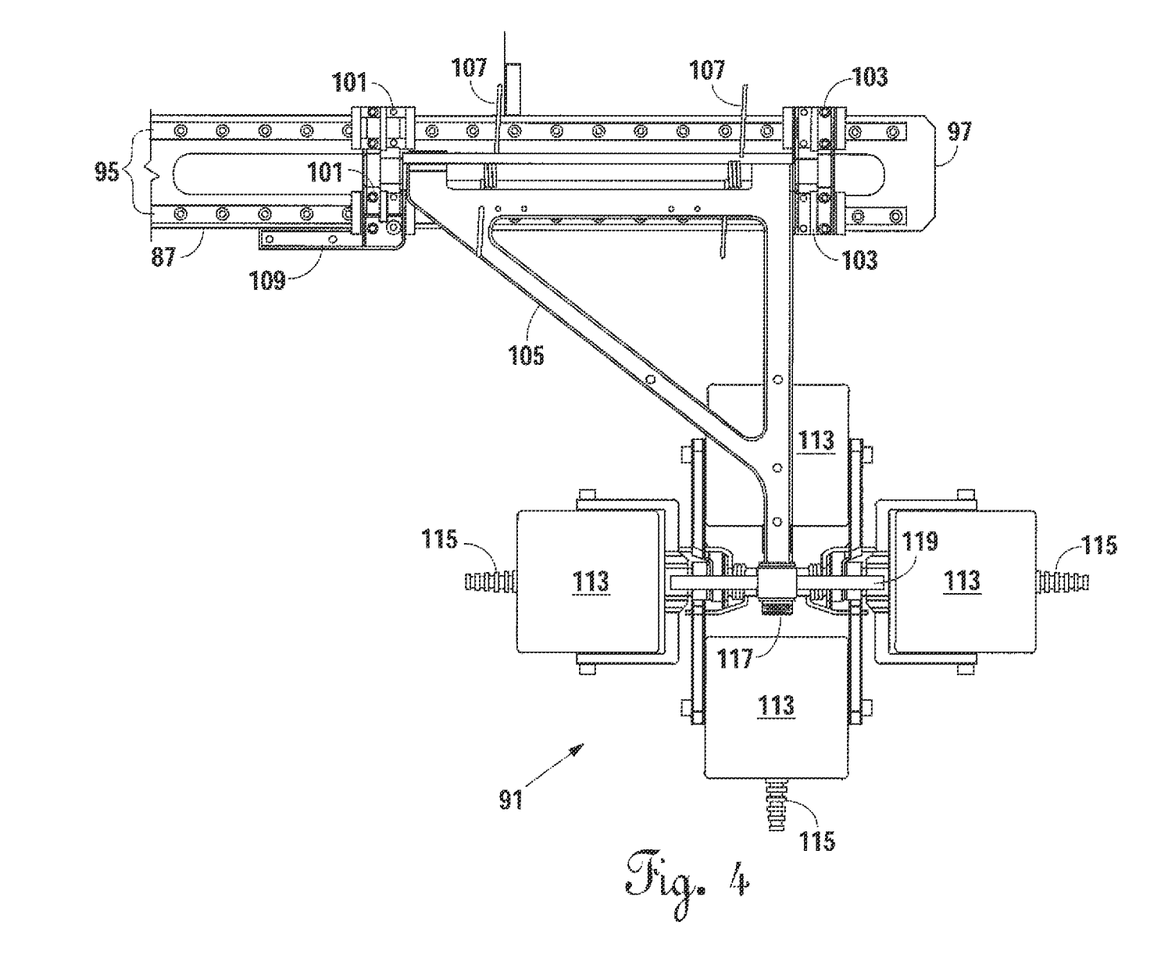
FIG. 4 is an enlarged view of a portion of FIG. 1.

Referring to FIG. 4, there is an enlarged view of the left end 97 of the rail support 87 showing the left Y-arm offset 105 with the transducers 113 mounted thereon. As can be seen in FIG. 4, the spring 107 continually urges the transducers 113 against the surface being inspected. The transducers 113 are connected to the left offset bracket 105 by shoulder bolt 117. Rotational movement of the transducers 113 may be limited by limiting bar 119.

Figure 5:
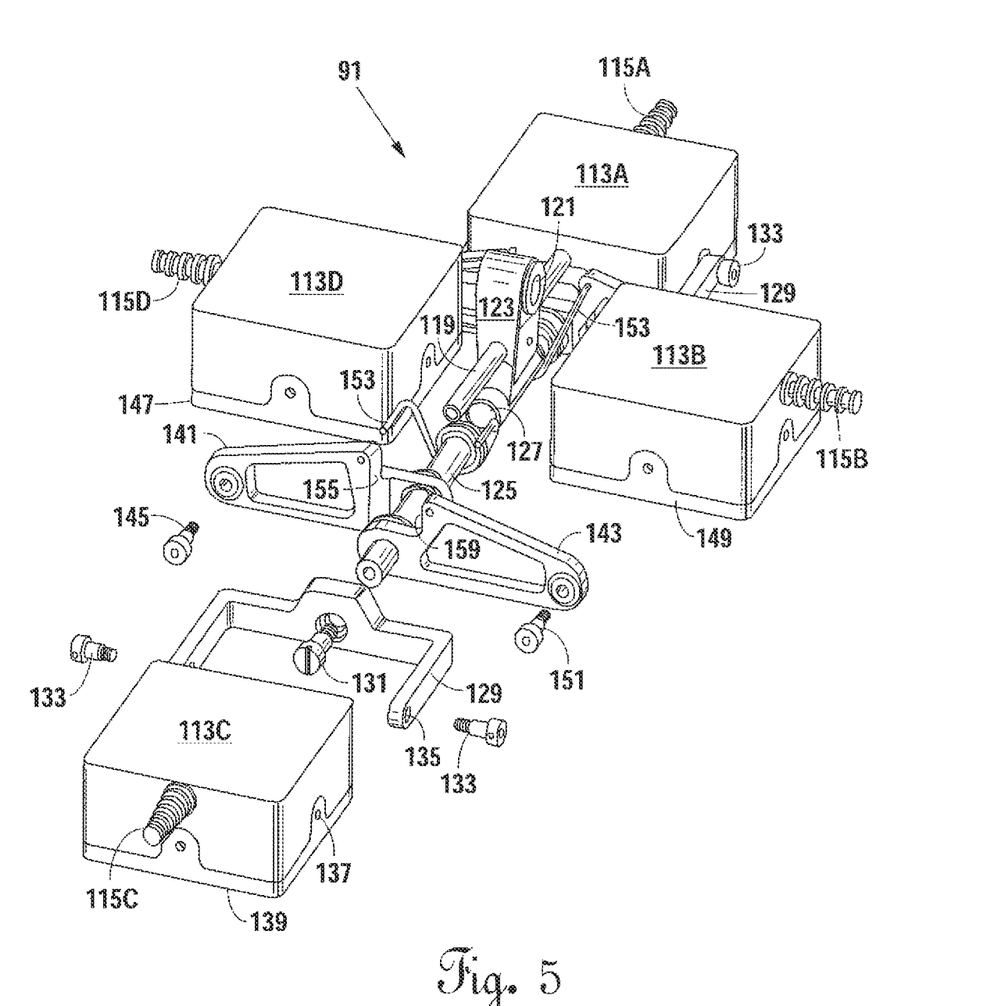
FIG. 5 is an exploded perspective view of a pod of transducers shown in FIG. 4.

Referring to FIG. 5, an exploded perspective view of the transducer pod 91 is shown. Each of the transducers 113 are further designated by the letters A, B, C or D. Likewise, the electrical connections 115 are designated with letters A, B, C and D corresponding with transducers 113 that bear the same letters A, B, C, or D.

Between transducers 113A and 113C is the shoulder bolt opening 121 to receive the shoulder bolt 117 therein (see FIG. 4). The shoulder bolt opening 121 is located in pivot bracket 123. Pivot bracket 123 holds the limiting bar 119 and is connected on the bottom thereof to the transducer center rod 125.

The transducer center rod 125 extends through transducer center rod opening 127 located through the bottom of pivot bracket 123. Each end of the transducer center rod 125 extends into a back side opening (not shown) in transducer end bracket 129. The transducer end bracket 129 is held onto the end of transducer center rod 125 by end screws 131. The transducer end bracket 129 is held to transducer 113C by side screws 133. Side screws 133 extend through hole 135 in transducer end bracket 129 to threadably connected in threaded hole 137 in each side of base 139 of transducer 113C.

While not shown and explained in detail, transducer 113A connects in the same manner as transducer 113C explained herein above. Transducers 113A and 113C can pivot around the center line of the transducer center rod 125 or around the center line of the shoulder bolt 117 (see FIG. 4).

Pivotally connected on the transducer center rod 125 is a rear transducer bracket 141 and a front transducer bracket 143. Rear transducer bracket 141 is connected to transducer 113D by rear transducer screws 145 threadably connecting to the base 147 of transducer 113D. While not visible in FIG. 5, another rear transducer bracket connects to the other side of transducer 113D in the same manner as rear transducer bracket 141.

Front transducer bracket 143 also is pivotally connected on transducer center rod 125 and is bolted to the base 149 of transducer 113B by front transducer screws 151. It is important that each of the transducers 113A, 113B, 113C and 113D have some movement capability so that they can as a group continually be urged in contact with the surface being probed. It is also important that the transducers 113A, 113B, 113C and 113D move independently of each other to the degree possible. Transducers 113B or 113D can rotate independently of any other transducer around transducer center rod 125. Springs 153 continually urge transducers 113B and 113D downward around the transducer center rod 125 and against whatever surface is being probed. To prevent excessive rotation by transducers 113B and 113D, limiting rods 119 may abut against shoulder 155 of front transducer bracket 143 or shoulder 159 of front transducer bracket 143.

By having independent pivotal movement of transducers 113A, 113B, 113C and 113D, the respective transducers can maintain better contact with the surface being inspected. For example, the reactor pressure vessel 19, as seen in FIG. 2, has a curved inner surface 85. On the curved inner surface 85 there may be some roughness of the surface due to manufacturing or deposits forming thereon. Hence it is important for the transducers 113A, 113B, 113C and 113D to maintain as good a contact with the inner surface 85 as possible. Therefore, each of the transducers are independently moveable while the entire pod 91 is continually being urged against the inner surface 85 by spring 107 (see FIG. 3).

In addition to the pivotal movement of the transducers 113A, 113B, 113C and 113D as described herein above, each of the transducers can rotate about the axis formed by the screws holding the transducers to respective brackets. For example, transducer 113C can rotate about the axis formed by screws 133. Transducer 113A can rotate in a similar manner.

Likewise, transducer 113B can rotate about the axis formed by front transducer screws 151. Transducer 113D can rotate about the axis formed by rear transducer screws 145.

Figure 6:
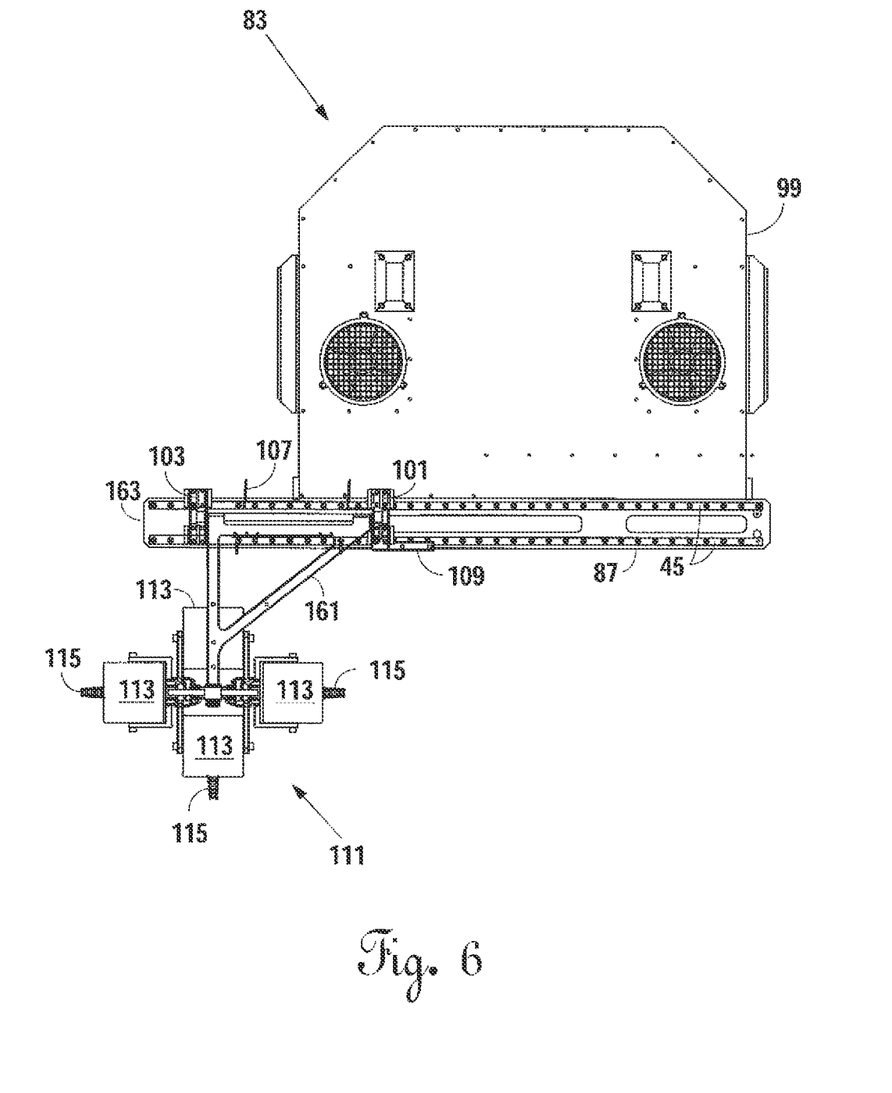
FIG. 6 is a top view of an underwater carriage having a pod of transducers pivotally mounted on bearing rails on a right front side thereof.

Referring now to FIG. 6, FIG. 6 is identical to FIG. 3, except left offset bracket 105 has been replaced with right offset bracket 161 and the rail support 87 has been relocated on the underwater carriage 83 so that the pod 111 is now located on the right end 163 of the rail support 87. Depending upon the obstruction within the vessel being inspected, the pod 111 of transducers 113 can be located on the left side of the underwater carriage 83 as shown in FIG. 3, or on the right side of the underwater carriage 83 as shown in FIG. 6. This allows for versatility in the position and location of the pod 111 of transducers.

Figure 7:
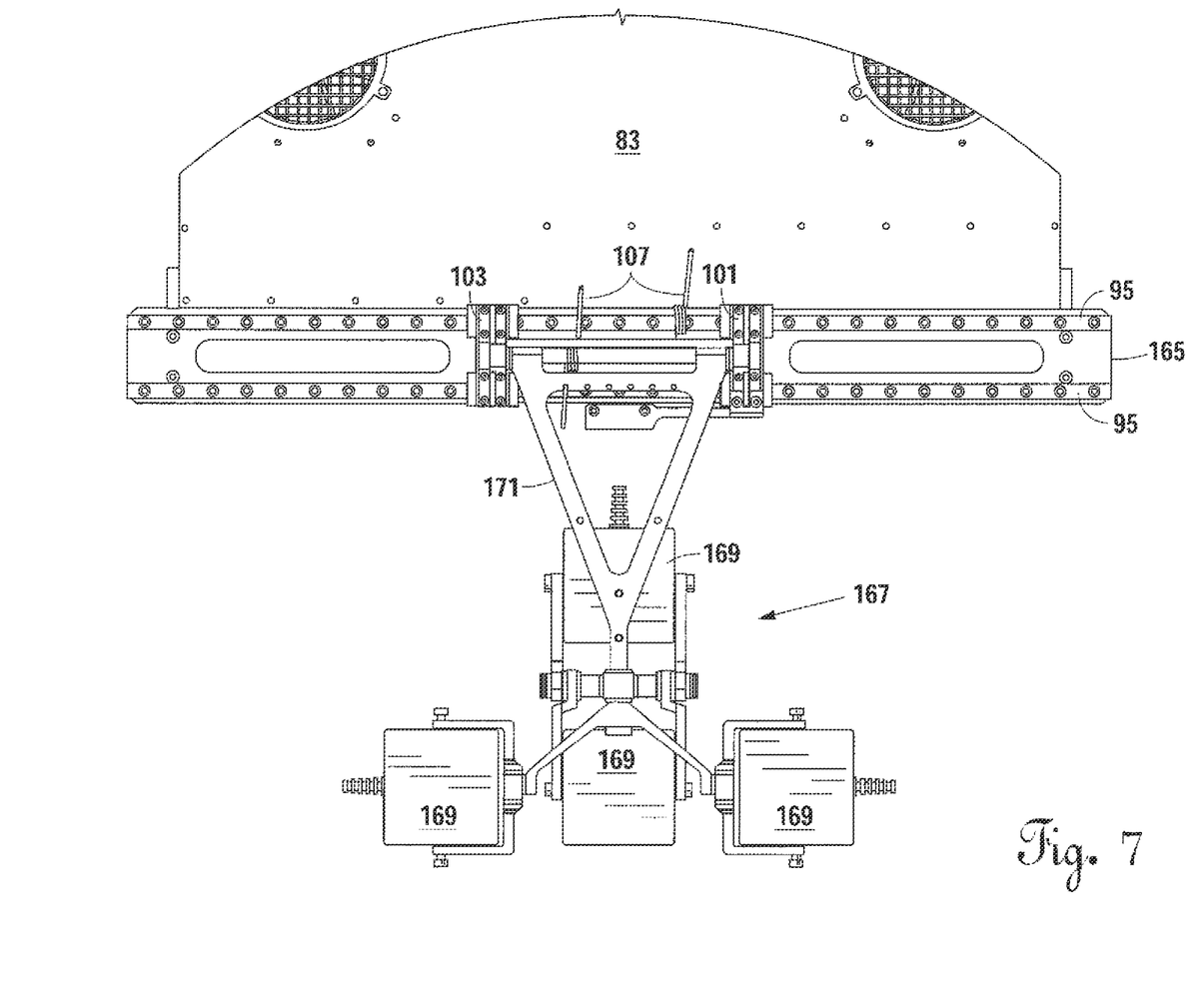
FIG. 7 is an alternative view for connecting a pod of transducers to a bearing rail mounted on an underwater carriage.
Figure 8:
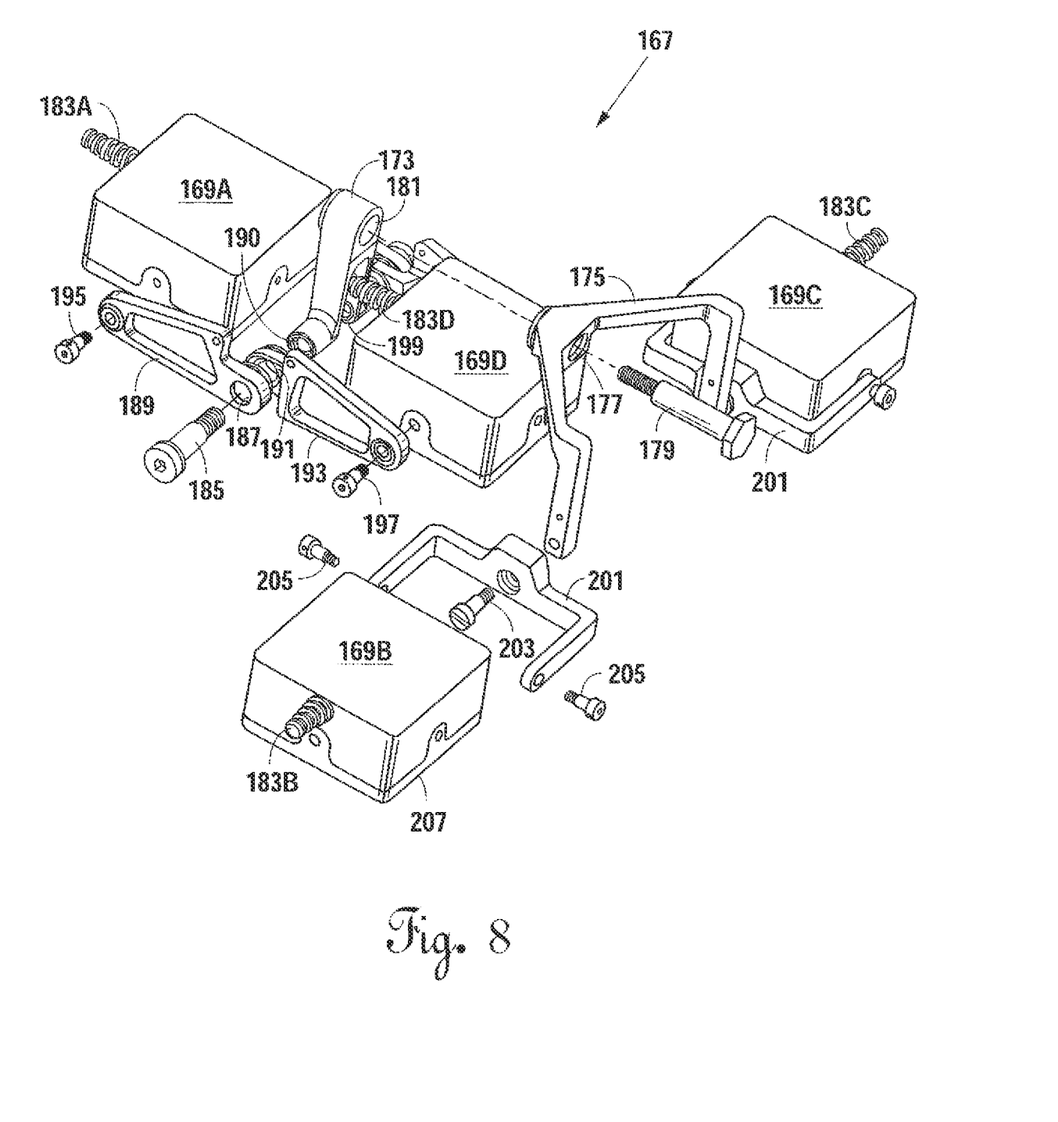
FIG. 8 is an exploded perspective view of the pod of transducers shown in FIG. 7.

The arrangement of transducers 113 in the pod 91 as shown in FIG. 5 is commonly referred to as a "little t" arrangement. There are other arrangements for the transducer pods. A different arrangement is shown in FIGS. 7 and 8, which is commonly referred to as a "big T" arrangement of transducers. In FIG. 7, the underwater carriage 83 has a rail support 165 mounted on the front thereof. The bearing rails 95 are the same as previously described along with bearing slide rail 101 and bearing slide rail 103. Also, spring 107 continually urges the pod 167 of transducers 169 against the surface being inspected. The transducers 169 are mounted on the forward end of triangular bracket 171. Triangular bracket 171 is pivotally mounted at the rear thereof to bearing slide rail 101 and bearing slide rail 103.

Referring now to FIG. 8, which is an exploded perspective view of the pod 167 of transducers 169, the entire pod 167 is mounted on the front end of the triangular bracket 171 (see FIG. 7) by connecting to center pivot bracket 173. A bolt 179 extends through opening 177 in side transducer bracket 175 and opening 181 in center pivot bracket 173 prior to threadably connecting to the front end of triangular bracket 171 (see FIG. 7). The bolt 179 has a smooth shank on the portions thereof extending through openings 177 and 181 to allow for free pivotal movement around the axis of bolt 179. Each of the transducers 169A, 169B, 169C and 169D electronically connect through electrical connections 183A, 183B, 183C and 183D, which form a part of the cable 93 shown in FIG. 2, back to the area at the top of the reactor containment vessel 13 (see FIGS. 1 and 2) where test personnel are located.

As shown in FIG. 8, the center pivot bracket 173 has a bolt 185 threadably connecting in each side thereof. The bolts 185 extends through opening 187 in rear transducer bracket 189 and opening 191 in center transducer bracket 193 to threadably connect with threaded hole 190 in center pivot bracket 173. Rear transducer bracket 189 and center transducer bracket 193 can freely rotate around the smooth portion of the shank of bolt 185. While not visible in FIG. 8, identical rear transducer bracket 189 and center transducer bracket 193 are located behind transducers 169A and 169D in a similar manner to the connections just described. The rear transducer bracket 189 is connected to transducer 169A by rear transducer screws 195. Transducer 169A may rotate about the axis of rear transducer screws 195. The center transducer 169D is connected to the center transducer bracket 193 by center transducer screws 197. Transducer 169D is free to rotate about the axis of the center transducer screws 197. However, the amount of rotation is limited due to the length of the slot 199 in center pivot bracket 173 through which electrical connection 183D extends. While not shown in FIG. 8, springs similar to springs 153 as shown in FIG. 5, will be utilized in FIGS. 7 and 8. The springs will continually urge transducers 169A and 169D into contact with the surface being inspected.

Attached to the front lower portion of side transducer bracket 175 are side transducer brackets 201. Side transducer brackets 201 are attached to the lower ends of side transducer brackets 175 by side transducer bracket screws 203. Transducer 169B is free to rotate around the axis of side transducer bracket screw 203. Side transducer screws 205 pivotally attach transducer 169B to side transducer bracket 201. Side transducer screws 205 threadably connect to the base 207 of transducer 169B. Transducer 169B is free to rotate about the axis of side transducer screws 205. While not explained in further detail, transducer 169C is connected in a manner similar to 169B.

By mounting of the transducer pods 167 in the manner as just described in conjunction with FIGS. 7 and 8, the independent movability of each of the transducers 69A, 69B, 69C and 69D is maintained to give the maximum contact with the surface being inspected. Also, the pivotal mounting of triangular bracket 171 and the continual urging of spring 107 urges the entire pod 167 in contact with the surface being inspected. The individual movability of each of the individual transducers 169A, 169B, 169C and 169D also helps ensure the maximum contact with the surface of the vessel being inspected. This gives a better signal, which in turn gives a more accurate reading and determination as to the condition of the vessel under inspection.

We claim:

1. An apparatus for inspecting inside a reactor containment vessel filled with a fluid, the apparatus comprising:
   a carriage having a shell with a skirt there around and thrust fans creating a vacuum to moveably attach said carriage to an inside wall of said reactor containment vessel, said carriage being independently moveable on said inside wall;
   a support rail attached to one edge of said shell of said carriage and moveable with movements of said carriage on said inside wall;
   at least two slides spaced apart and slideably attached to said support rail;
   a triangular shaped main bracket pivotally attached on one side to said slides and moveable along said support rail with movement of said slides;
   a main bracket spring for urging a corner opposite said one side of said triangular shaped main bracket toward said inside wall of said reactor containment vessel;
   a support structure pivotally connected to said corner of said triangular shaped main bracket;
   a first pair of transducer brackets pivotable about a first axis of said support structure;
   a second pair of transducer brackets spaced apart from said first pair of transducer brackets and pivotable about a second axis of said support structure, said first axis being perpendicular to said second axis;
   at least one transducer being located within each of said transducer brackets of said first pair and said second pair, said transducers each being pivotable within said transducer brackets;
   transducer springs for urging each of said transducers against said inside wall of said reactor containment vessel;
   said main bracket having three degrees of movement with movement of said carriage, said transducer brackets having at least two degrees of movement, and said transducers having at least one degree of movement, all totaling at least six degrees of movement to maximize contact by said transducers with said inside wall.

* * * * *